(12) United States Patent
Ullman et al.

(10) Patent No.: US 6,621,848 B1
(45) Date of Patent: *Sep. 16, 2003

(54) SECOIL REPROCESSING SYSTEM

(75) Inventors: Alan Zachary Ullman, Northridge, CA (US); Jan Vetrovec, Thousand Oaks, CA (US); William E. McDermott, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/557,803

(22) Filed: Apr. 25, 2000

(51) Int. Cl.[7] .............................. H01S 3/04; H01S 3/20; H01S 3/095
(52) U.S. Cl. .............................. 372/89; 372/34; 372/54
(58) Field of Search .............................. 372/89, 34, 54

(56) References Cited

U.S. PATENT DOCUMENTS

| | | |
|---|---|---|
| 3,668,881 A | 6/1972 | Thibault et al. |
| 3,879,680 A | 4/1975 | Naismith et al. |
| 3,992,685 A | 11/1976 | Ogren et al. |
| 4,267,526 A | 5/1981 | McDermott et al. |
| 4,348,766 A | 9/1982 | Born |
| 4,369,514 A | 1/1983 | Silfvast et al. |
| 4,494,381 A | 1/1985 | Lessard |
| 4,514,698 A | 4/1985 | Blumenthal et al. |
| 4,607,493 A | 8/1986 | Sukenobu |
| 4,718,241 A | 1/1988 | Lessard et al. |
| 4,979,369 A | 12/1990 | Larin et al. |
| 5,005,363 A | 4/1991 | Larin |
| 5,014,517 A | 5/1991 | Larin et al. |
| 5,518,528 A * | 5/1996 | Tom et al. ............ 95/103 |
| 5,624,654 A | 4/1997 | Clendening, Jr. et al. |
| 5,658,488 A | 8/1997 | Lonergan et al. |
| 5,802,093 A | 9/1998 | Townsend et al. |
| 5,802,095 A | 9/1998 | Schall |
| 5,841,804 A | 11/1998 | Toshikuni et al. |
| 5,859,863 A | 1/1999 | Clendening, Jr. et al. |
| 5,889,807 A | 3/1999 | Cunningham et al. |
| 6,154,478 A * | 11/2000 | Vetrovec ............ 372/89 |

OTHER PUBLICATIONS

Haefer, René A., *Cryopumping Theory and Practice*, Chapter 5, Clarendon Press, Oxford, UK, 1989.

Newton, K.R. and Bernstein, R.B., "Cryosorption–Pumped CW Chemical Laser", Applied Physics Letters vol. 33(1), Jul. 1, 1978, pp. 47–49.

John Vetrovec, Chemical Oxygen–Iodine Laser with a Cryosorptiom Vacuum Pump, Photonics West Conference, Jan. 24, 2000, pp. 1–12.

* cited by examiner

Primary Examiner—Paul Ip
Assistant Examiner—Armando Rodriguez
(74) Attorney, Agent, or Firm—Harness Dickey & Pierce P.L.C.

(57) ABSTRACT

A sealed exhaust chemical oxygen-iodine laser system is described, wherein the sealed exhaust system includes an adsorption bed for adsorbing sorbable material contained in the laser exhaust gas, and a temperature control assembly for controlling the temperature of the incoming laser exhaust gas and the adsorbent media of the adsorption bed.

19 Claims, 6 Drawing Sheets

SECOIL REPROCESSING SYSTEM

TECHNICAL FIELD

The present invention relates generally to chemical laser systems, and more particularly to an improved sealed exhaust chemical oxygen-iodine laser (SECOIL) system that employs, among other things, a sealed exhaust system that is capable of selectively condensing and sorbing various chemical species contained in the laser exhaust gas.

BACKGROUND OF THE INVENTION

The fact that an atom will emit a photon of radiation when one of its electrons drops to a lower energy state has enabled the laser to be employed in a number of military, industrial, and medical applications. The term "laser" is an acronym for light amplification by stimulated emission of radiation. In its simplest form, a laser consists of a rod of transparent crystal or a tube filled with gas or liquid. A reflecting mirror is placed at one end and a partially reflecting mirror at the other end. The laser is then pumped by adding energy, e.g., by shining another light source into it, by adding electrical energy, or by stimulating a chemical reaction. This process raises electrons in the laser to higher energy states.

During or subsequent to the pumping process, some of the electrons will spontaneously fall back to a lower energy state, emitting photons. The photons that travel toward the sides of the laser are quickly lost, but those traveling along the length of the rod or tube are reflected back by the mirrors. This activity generally occurs in the area commonly referred to as the laser gain region. When these photons strike other excited atoms, they stimulate those atoms to release photons of the exact same energy level (or wavelength), which travel in the same direction as the stimulating photons. The result is an intense, highly focused beam of light escaping through the half-silvered end of the laser. This light beam is generally referred to as a beam of coherent radiation, or more commonly, a laser beam.

Because the photon wavelength is determined by the characteristics of the atoms in the lasing material, laser light can be of a single wavelength. Because laser light travels in a tight beam, it can carry a great deal of energy over a great distance without significant loss. With respect to recent developments in laser technology, there has been increased interest in high-energy chemical laser systems.

High-energy chemical lasers can be classified as either: (1) hydrogen-halide lasers; or (2) chemical oxygen-iodine lasers (COIL). Hydrogen-halide lasers typically employ a reaction of hydrogen and/or deuterium with fluorine, chlorine, bromine or iodine in diluent gases of helium, nitrogen, or the like, to produce hydrogen and/or deuterium halide molecules in excited vibrational states from which laser energy can be extracted. Exhaust from the laser cavity of a hydrogen-halide laser is typically a mixture of gases at high temperature (up to 1000° C.) including HF (and/or DF), He, $N_2$, and possibly small amounts of $H_2$ (and/or $D_2$), and other gases.

In a COIL system, chlorine gas, with or without a diluent gas such as nitrogen or helium, reacts with a solution of basic hydrogen peroxide (i.e., usually KOH or other strong base mixed with hydrogen peroxide) to produce a gaseous flow of excited oxygen, also referred to as singlet delta oxygen or singlet molecular oxygen (designated as $O_2^*$, $O_2(^1\Delta)$, as well as by other symbols). This gaseous flow of singlet delta oxygen collides (typically at speeds approaching or even exceeding the speed of sound) with iodine gas molecules (i.e., $I_2$), dissociating them and exciting the resulting iodine atoms (i.e., I), which lase at 1.315 μm. The major laser byproducts are various salts (e.g., NaCl or KCl) and heat. Exhaust from the COIL laser cavity is typically a mixture of gases at near ambient temperature, including nitrogen or helium, oxygen, and small amounts of chlorine, iodine, and water. The small amounts of iodine can be scrubbed from the output.

The intended operation of a conventional COIL system can be summarized as follows. The initial step is to generate the singlet delta oxygen. This is accomplished by providing a source of basic hydrogen peroxide, typically in liquid form, and a source of molecular chlorine, typically in gaseous form. These two materials are then charged or injected into a singlet delta oxygen generator through appropriate manifold/conduit assemblies, respectively. The resulting exothermic reaction between the basic hydrogen peroxide liquid and the molecular chlorine gas produces the gaseous singlet delta oxygen, as well as several by-products, such as salt and heat. The heat can be removed by appropriate devices such as a heat exchanger, and the salt can be removed by appropriate devices such as a filter, if desired.

Once the gaseous singlet delta oxygen is generated, it is then charged or injected in flow form into a mixing nozzle at the appropriate time. The mixing nozzle has a throat portion which generally divides the mixing nozzle into a subsonic zone and a supersonic zone; that is, the flow of gaseous singlet delta oxygen is subsonic in one portion of the mixing nozzle and supersonic at the other portion of the mixing nozzle. The mixing of reactants is typically done in the subsonic zone, but their mixing can be done in other zones of the gain generator.

A molecular iodine generator is in communication with the mixing nozzle by an appropriate manifold/conduit assembly. At the appropriate time, gaseous molecular iodine is then charged or injected into the mixing nozzle in such a manner so as to partially or completely mix with the singlet delta oxygen gas flowing from the singlet delta oxygen generator. The mixing permits the singlet delta oxygen to dissociate some of the molecular iodine and thereby initiate the chain reaction dissociation by the product, excited atomic iodine.

The primary reactions taking place in connection with the conventional COIL system are as follows:

$$I_2 + {}_NO_2^* \rightarrow I_2^* + {}_NO_2. \qquad (1)$$

That is, a mole of molecular iodine reacts with several moles (denoted by the symbol "N") of singlet delta oxygen to produce a mole of excited molecular iodine and several moles of molecular oxygen.

$$I_2^* + O_2^* \rightarrow 2I^* + O_2. \qquad (2)$$

That is, a mole of excited molecular iodine reacts with a mole of singlet delta oxygen to produce two moles of atomic iodine and a mole of molecular oxygen.

$$I + O_2^* \rightarrow I^* + O_2. \qquad (3)$$

That is, a mole of atomic iodine reacts with a mole of singlet delta oxygen to produce a mole of excited atomic iodine and a mole of molecular oxygen.

$$I^* + h\nu \rightarrow I + 2h\nu. \qquad (4)$$

That is, a molecule of excited atomic iodine interacts with a photon and releases a second photon (hv), thus producing a molecule of atomic iodine.

The singlet delta oxygen gas flow initially contacts the gaseous molecular iodine gas at subsonic speed; however, the singlet delta oxygen gas flow is quickly brought up to near supersonic or even supersonic speed (via appropriate devices such as a venturi) and is expelled out through the mixing nozzle into the area known as the laser cavity or laser gain region. It is in this area where the excited atomic iodine releases its photon. The released photon is then reflected many times between a set of mirrors, the first mirror being fully reflective, the second mirror being partially reflective. The reflected photons eventually form a laser beam, which is transmitted through the partially reflective mirror at a wavelength of 1.315 $\mu$m. Any remaining chemical species are removed from the laser gain region by a combination of exhaust assemblies and scrubber assemblies in order to avoid contamination of the laser's mirrors and to allow continuing flow of the laser chemicals so as to sustain the lasing process.

Of particular interest are the vacuum pumps which supply the required flow throughput and pressure which draws the gas mixture through the laser cavity. High-energy chemical lasers, especially for military applications, often produce hundreds of kilowatts of optical power. The corresponding gas throughput in the range of 10–100 Torr pressure requires vacuum pumps with pumping speeds on the order of several hundred thousand liters per second. Military applications for high-power chemical lasers include tactical air defense which necessitates deployment of laser weapons in forward positions on the battlefield. Such laser weapons must be transportable and, therefore, of limited size and weight. In addition, the laser weapon should be concealable and undetectable by the enemy.

In laboratory practice, mechanical vacuum pumps, roots blowers, and steam ejectors are used to maintain flow conditions in chemical lasers. Gas exhausted from chemical lasers often contains hazardous materials such as iodine, chlorine, fluorine, hydrogen and hydrogen fluoride. In order to prevent the release of such materials into atmosphere, the laser exhaust gas must be scrubbed. Mechanical pumps with their concomitant scrubbers are too heavy and bulky for use in a transportable, field-deployable, high-power laser system. To overcome the size and volume limitations of mechanical pumps, Naismith et al. in U.S. Pat. No. 3,879,680 proposed a decontamination-capable, combustion-driven ejector for a hydrogen fluoride laser. However, ejectors, although smaller in size and weight than corresponding mechanical pumps, are still excessively large and heavy for use in a transportable COIL system where low cavity pressure necessitates multi-stage pumping. Furthermore, operation of ejectors is typically accompanied by acoustic noise and liberation of large amounts of hot gases and/or steam into the atmosphere which significantly reduce concealment and increase detectability of the high-power laser weapon and may interfere with the propagation of the laser beam.

A vacuum pump capable of pumping and safely containing exhaust from a hydrogen fluoride laser has been disclosed by Ogren et al. in U.S. Pat. No. 3,992,685. Pumping action here is produced by chemically reacting laser cavity exhaust gases with titanium, zirconium, and other reactive metals at elevated temperature. The laser exhaust is thus safely contained within the vacuum pump envelope. A refinement of Ogren's device and process was disclosed by Blumenthal et al. in U.S. Pat. No. 4,514,698 where pumping action is produced by a combination of condensation (to remove HF and/or DF), chemical reaction with Ti, Zr, etc. (to remove $O_2$, $H_2$ and/or $D_2$) and cryogenic adsorption to remove nitrogen. A considerable disadvantage of Ogren's and Blumenthal's processes is the need to separately remove constituents from the flow in several steps, some of which require high temperature reactions with metals. Because some of the reactions with metals are difficult to reverse, it can be deemed that neither Ogren's nor Blumenthal's apparatus could be easily regenerated. Blumenthal describes cryosorption of nitrogen only as a part of the multi-step pumping process, whereas oxygen is pumped by reaction with hot metals. In summary, the inventions of Ogren and Blumenthal are very specific for use with the hydrogen-halide laser and no reference is made to show how they may be adapted to a COIL system.

Cryosorption pumps of various designs have been used in the vacuum industry for many years (Cryopumping Theory and Practice, Chapter 5, by Rene A. Haefer, Claredon Press, Oxford, UK, 1989). Sorption pumps function by the physical adsorption of gases at the surface of molecular sieves or other sorption materials (e.g., activated $Al_2O_3$ or charcoal). Such materials have an extraordinarily large specific surface area per unit of mass (hundreds of $m^2/g$). Correspondingly, the capability of gas adsorption is considerable, up to 200 mg of nitrogen per g of synthetic zeolite (e.g., Linde 4A, manufactured by Union Carbide Corp., Danbury, Conn.) at the temperature of liquid nitrogen (77° K). A variety of natural and synthetic zeolites are currently readily commercially available. Sorption capacity of zeolites (i.e., maximum amount of gas that can be stored) is highly dependent on zeolite temperature and the pressure of gas above the sorption surface. In particular, at a constant pressure, the sorption capacity increases with decreasing temperature, while at a constant temperature, the sorption capacity decreases with decreasing pressure. For example, at a pressure of 10 Torr, changing the temperature from 293° K to 77° K increases the capacity of zeolite (e.g., Linde 4A) to sorb to nitrogen more than 200 times. Furthermore, during the sorption process, the sorption effect decreases with increased coverage of the sorption sites.

The sorption capacity of zeolites is also highly dependent on the gas to be pumped. In general, light inert gases are hardly pumped at all. For example, the capability of synthetic zeolite (e.g., Linde 4A) to pump helium or neon at a temperature of 80° K is several orders of magnitude lower than for COIL system gases, such as oxygen and nitrogen.

In general, cryosorption vacuum pumps can be classified as roughing and hard vacuum type. Cryosorption vacuum pumps for roughing applications are capable of evacuating vacuum chambers from atmospheric pressure down to a fraction of a Torr. These devices are usually quite simple in construction, comprising a metal flask containing zeolite. Vacuum suction is obtained at the flask throat as the flask is immersed into a bath of liquid nitrogen. The pumping process exerts a heat load to the zeolite. The heat load is due to a change in enthalpy of the gas as it is being cooled to the temperature of the zeolite and release of the heat of sorption. Because the zeolite can adsorb atmospheric oxygen and nitrogen only when cold, the pumping capacity of a zeolite roughing pump depends on its effectiveness to reject the heat load to the liquid nitrogen. The problem of maintaining the zeolite at low temperature is further compounded by zeolite's poor thermal conductivity. Zeolite roughing pumps are normally used in applications where time is not critical. Pump-down times on the order of 10–60 minutes are acceptable.

Cryosorption vacuum pumps for hard vacuum applications (e.g., below $10^{-3}$ Torr) normally encounter a lower head load than roughing pumps. This is due both to the reduced gas density and a refrigerated baffle (usually a chevron style) which is normally located at the intake to the pump and cools the incoming molecular flow of gas. Various designs of such pumps have been disclosed in prior art, for example by Thibault et al. in U.S. Pat. No. 3,668,881; Lessard et al. in U.S. Pat. Nos. 4,494,381 and 4,718,241; Sukenobu in U.S. Pat. No. 4,607,493, and Larin et al. in U.S. Pat. Nos. 4,979,369, 5,005,363 and 5,014,517. It should also be noted that cryosorption vacuum pumps for hard vacuum applications are not suitable for operation at high pressures (e.g., significantly above $10^{-3}$ Torr) due to their inability to reject the concomitant increase in heat load.

A hydrogen-halide laser entirely pumped by cryosorption has been described by Newton et al. in the article entitled: "Cryosorption-Pumped CW Chemical Laser" which was published in the Applied Physics Letters vol.33(1), on Jul. 1, 1978. Newton et al. used a commercially available zeolite sorption pump cooled by liquid nitrogen to operate a small (200–300 milliwatt) hydrogen-halide laser at cavity pressures of a few Torr and flow rates of several millimoles per second for periods of up to 6 hours. Because of its low flow rates, Newton's cryosorption pump has not experienced problems with rejection of heat of adsorption. However, Newton's concept is not scalable to a high-power chemical laser with its concomitant high flow rates.

In summary, a suitable cryosorption vacuum pump system for a COIL system requires the capability of handling relatively short (e.g., about 100 second) duration gas flow with a throughput on the order of 10–100 mol/s at about 10 to 30 Torr pressure. Gases to be pumped are expected to be at near ambient temperature (300 to 400° K), possibly moist (containing water vapor and possibly particulates), and contain corrosive and hazardous materials such as iodine and chlorine. Thus, a new cryosorption vacuum pump system, one specific for the needs of the COIL system, was needed. The cryosorption vacuum pump system should preferably be light-weight, compact, economical in refrigerant use, environmentally safe, and have a short regeneration time.

The Boeing Company has recently developed a proprietary sealed exhaust COIL system (SECOIL) including a sealed exhaust system (SES) that employs a cryosorption vacuum pump system that addresses the specific needs of the COIL system. The Boeing Company SECOIL has been disclosed in U.S. Pat. No. 6,154,478 issued to Vetrovec, and is further described below. Referring now to the drawings and the characters of reference marked thereon, FIG. 1 illustrates such a COIL system/cryosorption vacuum pump system, which includes a COIL system 10 and a cryosorption vacuum pump system 100. COIL system 10 utilizes a reaction of basic hydrogen peroxide liquor 12 and chlorine gas 11 which are supplied to a singlet oxygen generator 20 to produce excited oxygen gas in a metastable state known as the singlet delta oxygen ($O_2(^1\Delta)$) according to the reaction:

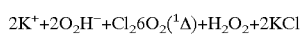

Nitrogen gas 14 may be also provided to the singlet oxygen generator as a diluent without taking part in the chemical reaction therein. Static pressure inside the singlet oxygen generator 20 is about 30 to about 100 Torr. Depleted basic hydrogen peroxide liquor is discharged from the singlet oxygen generator 20 through line 15. The produced $O_2(^1\Delta)$ is separated from the liquor and diluted by the nitrogen gas 14. The mixture of $O_2(^1\Delta)$, nitrogen diluent and unreacted chlorine is directed from the singlet oxygen generator 20 into a laser nozzle 30 where it is mixed with a continuous supply 32 of iodine vapor carried by a stream of nitrogen gas. This process facilitates an energy transfer from the $O_2(^1\Delta)$ to the iodine, by dissociating iodine molecules into atoms and bringing the iodine atoms to an electronically excited states known as $^2P_{1/2}$. Flow in the diverging part of laser nozzle 30 is aerodynamically accelerated to a supersonic velocity of typically Mach 2. Supersonic flow from nozzle 30 enters the laser cavity 44 containing an optical resonator including mirrors 50, 51 in a vacuum enclosure 48. Using an optical feedback provided by the mirrors, a coherent laser light can be extracted from the inverted population of the exited iodine atoms in the supersonic flow. An outcoupled beam of coherent laser light 45 is passed through the window 53 to the outside of the vacuum envelope. During this process, the excited iodine atoms decay from a high energy state $^2P_{1/2}$ to a lower energy state $^2P_{3/2}$ while releasing photons at 1.315 micrometer wavelength. COIL systems with a subsonic (rather than supersonic) flow were disclosed by McDermott in U.S. Pat. No. 4,267,526.

Depleted laser gas flows from the laser cavity 44 into the diffuser 60. Additional nitrogen purge gas can be used to protect optical components inside the enclosure 48. Such purge gas is then added to the flow in the cavity 44. The flow entering the diffuser 60 is a gas mixture containing approximately 70% $N_2$, 27% $O_2$, 1% $Cl_2$, 1% $I_2$ and 1% $H_2O$ vapor. The diffuser 60 decelerates the flow and allows recovery of static pressure. Static pressure at the downstream end of the diffuser 60 is typically in range of about 5 to 20 Torr and the corresponding flow velocity is about Mach 0.1 to about Mach 0.3. Continuous flow of gas from the singlet oxygen generator 20 up to the end of the diffuser 60 under vacuum conditions is made possible by continuous suction provided by the cryosorption vacuum pump system 100.

Decelerated flow from the diffuser 60 enters the cryosorption vacuum pump system 100 through an isolation valve 101 in an open position. The flow is directed into a gas chiller 105. The chiller 105 includes a plurality of surfaces cooled to a temperature around 80° K. These surfaces are so arranged and disposed so as to chill the incoming gas flow to approximately 100° K while condensing and/or freezing out chlorine gas, iodine and water vapor out of the flow and trapping them onto the cooled surfaces. Cold and dry gas containing only nitrogen and oxygen is directed from the gas chiller 105 through an isolation valve 106, in an open position, and toward a zeolite bed 110 in a vacuum vessel 120. The zeolite bed 110 uses a suitable zeolite sorption material such as synthetic zeolite, e.g., Linde 4A, cooled to a temperature of approximately 80° K to adsorb and trap the incoming mixture of nitrogen and oxygen gas. The zeolite is preferably provided in granular form and is configured in layers several millimeters to several centimeters thick to provide a large exposed surface to the sorbed gas. Limiting the size of the granules and thickness of the zeolite layers provides a more direct path for the sorbed gas to travel to sorption sites in the zeolite, thereby reducing impedance to the flow and increasing effective pumping speed of the zeolite bed 110. Although synthetic zeolite is preferred, it should be noted that other sorption materials, such as natural zeolites or activated charcoal, may used in lieu thereof.

Cooling the gas chiller 105 and the zeolite bed 110 to the required temperature is accomplished by a suitable cryorefrigerant, such as liquid nitrogen or liquid argon, stored in dewar 130. When cooling is required, the cryorefrigerant is provided from dewar 130 through line 131 to refrigerant control valves 132 and 133 which respectively control flow through line 134 to the gas chiller 105 and through line 135 to the zeolite bed 110. The cryorefrigerant can be either gravity fed, pump fed, or fed by dewar pressure. Refrigeration can be realized by boiling-off cryorefrigerant inside heat exchangers (not shown) within the gas chiller 105 and the zeolite bed 110. Alternately, the refrigerant can be recirculated between the heat exchangers and external boilers. Other schemes for providing refrigeration of the laser gases in the gas chiller 105 and the zeolite bed 110 can be realized, as is well known to those skilled in the art of refrigeration. In either case, the supply of cryorefrigerant must be sufficient to cool down the gas chiller 105 and zeolite bed 110 to the required temperature, overcoming thermal leaks, rejecting the heat released by cooling and condensing and/or freezing out gases in the gas chiller 105 and rejecting the heat released by cryosorption onto the zeolite bed 110. A heat shield 121 is positioned between the zeolite bed 110 and the vacuum vessel 120. The heat shield reduces radiative and convective heat load to the zeolite bed 110. It can be constructed of multiple layers of polished sheet metal with small gaps therebetween, or of multiple layers of aluminum coated mylar, or other suitable means used in the cryogenic industry. In order to reduce convective heat load to the zeolite bed 110, the interior of the vacuum vessel 120 can be coated or lined with a thermally insulating material, for example, TEFLON™.

During operation of the COIL system 10, gases are drawn through the laser cavity 44 by suction provided by gas sorption onto the zeolite material in the zeolite bed 110. With increasing quantity of sorbed gas and constant temperature of the zeolite material, the pressure inside vacuum enclosure 120 steadily rises. At a point where the pressure differential between the vacuum enclosure 120 and the cavity 44 is no longer sufficient to sustain required supersonic flow through said cavity, the sorption capacity of the zeolite bed 110 is deemed exhausted, and operation of the laser 10 is terminated by shutting off the flows of chlorine 11, nitrogen 14, and iodine 32.

The cryosorption vacuum pump system 100 can be regenerated and made available for the next sorption cycle by removing the sorbed gas. The regeneration process is started by isolating the gas chiller 105 and the zeolite bed 110 from the laser 10 by closing the isolation valves 101 and 106. Then the supply of cryorefrigerant is terminated by closing the control valves 132 and 133. Finally, the gas chiller 105 and the zeolite bed 110 are allowed to warm up. The warm-up process can be accelerated by, for example, application of external heat either by electric heaters (not shown), recirculation of warm fluid through heat exchangers within the gas chiller 105 and the zeolite bed 110, microwave heating, dielectric heating, or by flowing a warm gas through the gas chiller 105 and the zeolite bed 110. Depending on the choice of cryosorption media, most of the sorbed gas can be released with only modest increase in temperature. For example, warming the Linde 4A zeolite from 78° K to 180° K can release over 90% of sorbed oxygen and nitrogen. Allowing removal of sorbed gas with only modest temperature increase economizes on use of cryorefrigerant. The temperature of the gas chiller 105 has to be increased substantially higher to allow removal of condensed and/or frozen chlorine gas and water vapor as either gas or liquid. Desorbed gas or liquid is removed from the system by means of auxiliary vacuum pumps 144 and 154. With the control valve 142 in open position, the vacuum pump 144 draws gas from the vacuum enclosure 120 through line 141 and 143, and exhausts the gas through line 145 into filter 146. The filter 146 traps hazardous materials such as iodine and chlorine which may be found in trace amounts in the flow through line 145. Clean gas is then exhausted through line 147 into the atmosphere. Gas or liquid liberated from the gas chiller 105 are removed in a similar fashion. With the control valve 152 in an open position, the vacuum pump 154 draws gas from gas chiller 105 through line 151 and 153, and exhausts the gas through line 155 into filter 156. The filter 156 traps hazardous materials such as iodine and chlorine which may be found in substantial amounts in the flow through line 155. Clean gas or liquid is then exhausted through line 157 into the atmosphere. When the gas chiller 105 and the zeolite bed 110 have been outgassed to a desirable level, the control valves 142 and 152 are closed, auxiliary vacuum pumps 144 and 154 are turned off, and the flow of refrigerant to the gas chiller 105 and zeolite bed 110 is restored by opening valves 132 and 133. After the gas chiller 105 and the zeolite bed 110 reach the desired temperature, the system 100 is deemed regenerated and available to provide vacuum suction for the COIL system 10. At this point, the isolation valves 101 and 106 can be opened and laser operation may commence. It should be noted that the regeneration process may last substantially longer than operation of the laser. For example, the laser may operate typically for only 100 seconds during which several hundred to several thousand mols of oxygen-nitrogen mixture are sorbed by the cryosorption pump system 100. The subsequent regeneration cycle may last from several minutes to several hours.

FIG. 2 is an illustrative diagram of the working function of the zeolite bed using the Linde 4A zeolite molecular sieve for a mixture of oxygen and nitrogen. The diagram plots the sorption capacity of the zeolite bed 110 versus logarithm of the pressure inside the vacuum enclosure 120. Sorption capacity is defined herein as the maximum amount of gas that can be sorbed onto the zeolite under specified pressure and temperature conditions of the gas. At point A there is no gas flow into the vacuum enclosure 120. The partial pressure of the $O_2$—$N_2$ mixture inside the enclosure 120 is substantially less than 1 Torr and the zeolite is at a temperature of 200° K. Under these conditions, Linde 4A zeolite contains only a small fraction of its sorption capacity at 77° K. Starting from point A conditions and cooling the zeolite from 200 to 77° K (point B) simultaneously increases zeolite sorption capacity and reduces the partial pressure of the $O_2$—$N_2$ mixture inside the enclosure 120. At point B the zeolite is suitable for efficient cryosorption. Operation of the COIL system 10 includes flowing a mixture of $O_2$—$N_2$ gases into the zeolite bed 110 where the mixture gets adsorbed. Providing that the heat released during adsorption is rejected into the refrigerant or absorbed by the thermal mass of the zeolite, the temperature of the zeolite during the sorption process remains essentially constant. With increased quantity of gas occupying sorption sites in the zeolite the partial pressure of the $O_2$—$N_2$ mixture inside the enclosure 120 steadily rises, thereby slightly increasing the sorption capacity. When the partial pressure of the $O_2$—$N_2$ mixture reaches the limit at point C the pressure differential between the enclosure 120 and the laser cavity 44 cannot sustain a supersonic flow through the cavity and the laser operation is terminated. With the isolation valves 101 and 106 in closed position, the zeolite is allowed to warm-up to about 200° K and liberate most of the adsorbed gas. During this process, the pressure inside the enclosure 120 steadily rises up to point D. Liberated gas is removed by the auxiliary vacuum pump 144 until the pressure inside the enclosure drops to below about 1 Torr, thereby returning the system to the starting point A. It should be understood that the FIG. 2 diagram represents an idealized process and is intended for illustration only. For example, under realistic operating conditions, a constant zeolite temperature cannot be easily maintained and, as a result, the actual working diagram of the zeolite bed 110 is somewhat more complex. Furthermore, in practice, it is desirable to remove desorbed gas from the vacuum enclosure 120 during the desorption process facilitated by the warm-up. This can be represented by a broken curve starting at point C and leading to point A in FIG. 2.

FIG. 3 shows a cryosorption assembly 200, containing a zeolite bed. The zeolite bed comprises a coaxial array of thin, washer-like annular containers 204 filled with sorption material 205. The sorption material 205 is preferably a synthetic zeolite, e.g., Linde 4A, provided in a granular form with a grain size of approximately 1 mm. Zeolite may be provided either as sintered particles or an agglomeration of loose particles. Thickness of the containers 204 is typically from several mm to several cm and is selected primarily to reduce impedance to gas flowing to sorption sites within the zeolite 205. The containers 204 have gaps therebetween to allow a flow of gas reaching both sides of the containers. The gap between adjacent containers 204 is roughly the same size as the thickness of the containers 204. Walls 206 of the containers 204 are constructed from porous, perforated or a screen-like material having pores or apertures which are substantially smaller than the size of the zeolite grains located inside the containers 204. The pores or apertures are intended to provide a path through which gas can flow into and out of the containers 204 without suffering significant pressure loss. The containers 204 are enclosed in a vacuum enclosure 120. The enclosure 120 has an inlet port 201 and outlet port 202. The enclosure 120, which is typically at room temperature, has its internal walls lined with thermal shield 121 which reduces radiative and convective heat load to the containers 204 which operate at reduced temperature. During a sorption cycle, the zeolite containers 204 and the zeolite material 205 inside are maintained at a temperature of approximately 77° K and the outlet port 202 is closed. A dry mixture of oxygen and nitrogen free of condensable vapors and gases, and chilled to about 100° K, enters the vacuum enclosure 120 through the inlet port 201, flows through central openings in containers 204 and into the gaps therebetween, through the permeable walls 206 and is sorbed onto zeolite 205. During a desorption (i.e. regeneration) cycle, the inlet port 201 is closed and the outlet port 202 is opened. The zeolite 205 is warmed up to approximately 200° K to release sorbed gases. Possible approaches to warming the zeolite include electric heating with heating elements 209 in contact with the zeolite 205, heating with warm fluid acting through a heat exchanger in contact with the zeolite, or by flushing the zeolite with warm gas.

A suitable configuration of a heat exchanger, designated generally as 207, embedded in zeolite 205, is shown in FIG. 4. The heat exchanger 207 comprises fluid passages 231 and fins 232 in contact with the zeolite 205. By alternating between warm and cold heat transfer fluid in passages 231, this kind of heat exchanger can be used to warm the zeolite 205 during the regeneration cycle and chill the zeolite 205 during the sorption cycle. Flushing the zeolite 205 with gas can be performed by introducing a warm dry gas such as nitrogen or argon inside the vacuum enclosure 120 (FIG. 3) in the proximity of the inlet port 201, the gas flowing around and into containers 204, warming up the zeolite 205 therein, and allowing the zeolite 205 to release adsorbed gas. Desorbed gas and flush gas (if used) are removed through the outlet port 202 and fed into a auxiliary vacuum pump 144. During a sorption cycle, the zeolite 205 is chilled to a temperature of approximately 77° K. In preparation for a sorption cycle, the vacuum enclosure 120 is evacuated prior to chilling the zeolite 205. The zeolite 205 can be chilled by applying a cryorefrigerant into a heat exchanger in contact therewith as already explained above or by flushing the zeolite 205 with a cold light noble gas. Because light noble gases such as helium, neon, and, to some degree also, argon are not significantly sorbed by zeolites, such gases can be used to flush-chill the zeolite 205 without filling zeolite sorption sites. Flushing the zeolite 205 with light noble gas for the purpose of heating or chilling can be made more effective if, during the flush process, the central openings in the containers 204 are mechanically blocked, thereby forcing the flush gas to flow through the containers 204 and zeolite 205 therein.

The heat leased during the sorption process is deposited into the zeolite 205 and, unless this heat is rejected into refrigerant, the zeolite 205 temperature will rise. In order to tolerate such a temperature rise without significantly reducing sorption capacity of the zeolite 205, the zeolite 205 can be initially chilled to a substantially lower temperature than the normal operating temperature of approximately 80° K. During the sorption process, the heat of sorption is rejected by the thermal mass of the zeolite 205 and the zeolite 205 temperature is allowed to rise up to about 80° K.

Although the SECOIL system described above and in U.S. Pat. No. 6,154,478, issued to Vetrovec represents a significant improvement in COIL system efficiency and operation, there are several areas that could be improved. For example, the reprocessing of the vacuum pump's zeolite adsorption bed entails cycling the adsorption bed between its cryogenic operating temperature (approximately 77° K/–321° F.), its high temperature (approximately 400° K/260° F.) to desorb the gas, and then back down to its cryogenic temperature (by indirect contact or by flowing cold helium) for reuse.

Heating the zeolite causes gas evolution because desorption of gas from zeolite is strongly endothermic; hence, the process is driven towards desorbed gas as the zeolite bed temperature is increased. While this is logical and in accord with the process thermodynamics, this process is cumbersome and costly because it requires: (1) a great deal of energy for heating the bed by 500 to 700° F.; (2) large quantities of cryogens to rechill bed over the equivalent temperature range; and (3) the system to be off-line for long periods during heating and cooling cycles, generally several hours.

In the event that operation is required repetitively and for extended periods, multiple adsorption beds can be used sequentially while other beds are being reprocessed. Because the beds typically require several hours to reprocess, this can be cumbersome. Because of the low thermal conductivity of the zeolite material and its affinity for most gases and liquids, it is difficult to reduce this reprocessing time, especially for large devices.

Because of these complexities, other means of producing the required operating vacuum have been used for laser operations. At one end of the spectrum are systems using mechanical vacuum pumps and ejectors. These are large systems that provide the capability to handle the peak vacuum flows in real time with recovery to ambient pressure. These would therefore be most suitable if the laser were running continuously. At the other end of the spectrum, some lasers have been built using large evacuated vessels as receivers for the laser exhaust gas, with recovery to ambient pressure occurring slowly using a relatively small vacuum pump. This is most suitable for test systems that run only once or a few times over a several hour time period. In many applications, the laser runs repetitively but at only a modest duty factor. In this case neither of these implementations are fully practical.

Other processes for gas adsorption and purification utilize a technique called pressure swing adsorption (PSA), where the relative affinity of an adsorbent for various gases is used to alternatively collect and expel one or more gases from a gas mixture. This is analogous to the use and reprocessing of zeolite as described above, but generally adsorbs the gas at high pressure and desorbs the gas at low pressure. In PSA, the adsorption process is also exothermic, so heat is used to increase the rate of desorption in that portion of the cycle.

Therefore, there exists a need for a system for reprocessing the zeolite adsorption bed that uses much less energy and cryogen, and that does not render the laser system inoperable over an extended period of time.

BACKGROUND ART

U.S. Pat. No. 4,348,766 issued to Born discloses that the efficiency of a chemically fueled laser with regenerative cooling of its combustion chamber is increased by using the fuels as coolant in the diffuser. The heat resulting from this cooling in the diffuser is supplied in a regenerative manner to the combustion chamber or rather to the laser gas.

U.S. Pat. No. 4,369,514 issued to Silfvast et al. discloses an efficient recombination laser comprises a resonant laser cavity, a gaseous laser material disposed in the cavity, and means for providing a plasma discharge in said laser material, which plasma discharge is confined to a cylindrical region along the axis of the laser cavity. The plasma in the gaseous laser material expands outward radially from the cylindrical region at the axis of the cavity and cools by interacting with the adjacent unexcited gas. The maximum laser gain is provided in an annular region, which annular region is adjacent to and surrounds the initial discharge cylindrical region. In one embodiment of the present invention, the means for providing the plasma discharge comprises two pin-type electrodes which extend into the cavity along the cavity axis.

U.S. Pat. No. 4,514,698 issued to Blumenthal et al. discloses a chemical laser including a laser pump which is relatively lightweight with no moving parts. This produces a low pressure, regenerable, closed system for treating laser cavity exhaust gases to remove (i.e., pump) them from the system. The exhaust gases which emerge from the laser cavity of the chemical laser are pumped by a combination of condensation, cryogenic adsorption, and by reaction preferably with titanium, titanium-zirconium alloys, zirconium, tantalum, etc. These exhaust gases include hydrogen, deuterium and their halides, the halogens, oxygen, $CO_2$, nitrogen and $H_2O$. This obviates the requirements for heavy equipment normally employed to produce a high vacuum in the laser cavity.

U.S. Pat. No. 5,624,654 issued to Clendening, Jr. et al. discloses a system for preparing excited molecular oxygen in the excited singlet-delta electronic state for use in a chemical laser that minimizes salt formation utilizing the common ion effect. In one version, basic hydrogen peroxide is formed by combining $H_2O_2$ and at least two bases. In another version of the invention, the basic hydrogen peroxide is reacted with a gas containing at least two halogen species.

U.S. Pat. No. 5,658,488 issued to Lonergan et al. discloses a method and apparatus for regenerating basic hydrogen peroxide (BHP) solution. Such solution is run through filters which are alternated for continuous filtration thereof, while the non-used filter is being cleaned. The filtered BHP solution is then reacted with $H_2O_2$ and $KO_2$ or KOH in a cooled reactor and again filtered and fed to a cooled storage tank as replenished BHP solution. The replenished BHP solution can then be fed to a singlet oxygen generator (SOG) for reaction with $Cl_2$ to emit singlet delta oxygen (to fuel a COIL laser system) and depleted BHP solution, which is then recycled for filtration and regeneration as before. Thus the process of the invention provides for continuous regeneration of BHP solution for extended use in a COIL. That is, extended COIL run times are required by a COIL for welding and/or cutting operations. At the same time the process of the invention minimizes the amount of BHP required to run the COIL singe the BHP is regenerated and recycled. Further, smaller BHP run/mix/storage tanks can be used.

U.S. Pat. No. 5,802,093 issued to Townsend et al. discloses a continuous wave photolytic iodine laser that has a gain cell for receiving a continuous supply of gaseous fuel. The gain cell is connected to laser beam transfer optics, a laser resonator for shaping a laser beam, and a lamp. The lamp is driven by a microwave subsystem such that a laser gain medium is pumped through the gain cell. The continuous wave photolytic iodine laser of the present invention incorporates a closed loop fuel system for presenting gaseous fuel to the gain cell at a rate sufficient to sweep any lasing by-products out of the gain cell, thereby preventing quenching of the lasing process. The fuel system also includes a condenser for converting the gaseous fuel to a liquid after it has passed through the gain cell, a scrubber for removing the by-products of the lasing process from the fuel, and an evaporator for converting the recycled liquefied fuel back to a gas. The closed loop fuel system also includes a pump for pressurizing and transporting the liquefied fuel.

U.S. Pat. No. 5,802,095 issued to Schall discloses an improved oxygen-iodine laser comprising a reaction unit for the generation of a gas stream composed of excited oxygen by chemical reaction between a reaction liquid and a reaction gas, a steam trap with a condensation chamber, in which steam entrained by the gas stream is condensed onto cold surfaces, an iodine injector, which injects iodine into the gas stream to generate a laser-active gas mixture, and a laser resonator with the laser-active gas mixture flowing through it, in such a way as to obtain a gas stream as free from steam as possible using the simplest possible means, it is proposed that the cold surfaces for separation of the steam are formed by liquid surfaces of a condensation liquid moved in the condensation chamber.

U.S. Pat. No. 5,841,804 issued to Toshikuni et al. discloses an improved method and apparatus for regeneration and reuse of $He-N_2-CO_2$ mixed gas for carbon dioxide gas laser. The laser gas after use is contacted with a noble metal catalyst (for example, $Pt-Al_2O_3$) at a temperature of 200°–300° C. to react CO and $O_2$ formed by laser discharge so as to form $CO_2$. A suitable quantity of moisture in the contained laser gas causes steam-reforming reaction of $H_2O$ and CO, and reaction of $H_2$ and $O_2$ following thereto, and continuous operation over a long period is thus possible. Poisoning of the catalyst by $NO_x$ is suppressed at this relatively high temperature of reaction. Activity of the catalyst, when decreased, may be recovered by reactivation by passing a reactivating gas consisting of carbon monoxide, oxygen and helium through the catalyst bed at a temperature of 400° to 500° C.

U.S. Pat. No. 5,859,863 issued to Clendening, Jr. et al. discloses a system for preparing excited molecular oxygen in the excited singlet-delta electronic state for use in a chemical laser that minimizes salt formation utilizing the common ion effect. In one version, basic hydrogen peroxide is formed by combining $H_2O_2$ and at least two bases. In another version of the invention, the basic hydrogen peroxide is reacted with a gas containing at least two halogen species.

U.S. Pat. No. 6,004,449 issued to Vetrovec discloses an alkaline peroxide cell for electrolytic regeneration of spent basic hydrogen peroxide from a chemical oxygen iodine laser. The cell has separate compartments for regenerating chlorine and for regenerating basic hydrogen peroxide . Regenerated chlorine and basic hydrogen peroxide are suitable for use in a chemical oxygen iodine laser.

OBJECTS AND SUMMARY OF THE INVENTION

It is therefore a principal object of this invention to provide a new and improved chemical laser system.

It is another object of this invention to provide a new and improved chemical oxygen-iodine laser system.

It is another object of this invention to provide a new and improved sealed exhaust chemical oxygen-iodine laser system.

It is another object of this invention to provide a new and improved sealed exhaust system for a chemical oxygen-iodine laser system.

It is another object of this invention to reduce the size, weight, and power consumption of a sealed exhaust chemical oxygen-iodine laser system.

It is another object of this invention to reduce the size, weight, and power consumption of a sealed exhaust system for a chemical oxygen-iodine laser system.

In accordance with one embodiment of the present invention, a sealed exhaust system for use in conjunction with a chemical oxygen-iodine laser system is provided, wherein the chemical oxygen-iodine laser system includes a laser cavity, comprising:
 a sealed exhaust system for removing exhaust gas from the laser cavity, the sealed exhaust system comprising:
  a sorption assembly for sorbing a sorbable material contained in the exhaust gas; and
  a temperature control assembly for controlling the temperature of the exhaust gas and the sorption assembly.

In accordance with another embodiment of the present invention, a sealed exhaust chemical oxygen-iodine laser system is provided, comprising:
 (a) a chemical oxygen-iodine laser system including a laser cavity; and
 (b) a sealed exhaust system for removing exhaust gas from the laser cavity, the sealed exhaust system comprising:
  (i) a sorption assembly for sorbing a sorbable material contained in the exhaust gas; and
  (ii) a temperature control assembly for controlling the temperature of the exhaust gas and the sorption assembly.

In accordance with another embodiment of the present invention, a method of operating a sealed exhaust chemical oxygen-iodine laser system is provided, comprising:
 (a) providing a chemical oxygen-iodine laser system including a laser cavity; and
 (b) providing a sealed exhaust system for removing exhaust gas from the laser cavity, the sealed exhaust system being in communication with the laser cavity, the sealed exhaust system comprising:
  (i) a sorption assembly for sorbing a sorbable material contained in the exhaust gas; and
  (ii) a temperature control assembly for controlling the temperature of the exhaust gas and the sorption assembly.

These and other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference of characters.

DETAILED DESCRIPTION OF THE PREFERRED EMBODIMENTS

In accordance with the general teachings of the present invention, an improved system of reprocessing an adsorption bed of a sealed exhaust system (SES) used as part of a Chemical Oxygen-Iodine Laser (COIL) system. This system provides greatly reduced power and refrigerant requirements; more compact, simpler system designs; and means of allowing rapid repetitive SECOIL system operations without a "real time" vacuum capability.

In conventional approaches, heat is supplied to the adsorbent bed to desorb gases and the bed is then rechilled to cryogenic temperatures. Conversely, the present invention provides that the gas is removed by evacuation at low temperature only and the adsorbent bed is cooled by a combination of gas evacuation and direct gas or bed chilling. The amount of gas evacuation and gas/bed chilling are selected in a manner such that the state of the adsorbent bed prior to gas adsorption can be exactly reproduced and the operation of the adsorbent bed continued indefinitely. The gas evacuation and gas/bed chilling processes are conducted in parallel with the use of the SES as a vacuum system. In this manner the SECOIL system is never off-line for more than brief (seconds to minutes) periods and the laser system can operate at a relatively high duty and in repetitive manner. As a result, the following benefits are obtained: (1) reduced size, weight, and cost for a vacuum system able to pump a COIL device with a moderately high duty factor; (2)

integration of laser and SES operations with reprocessing to minimize size, weight, energy consumption, cryogen usage, and operating complexity; and (3) controlled low-flow exhaust which drastically reduces size of components needed for environmental control, personnel protection, and gas repressurization.

Figure 1:
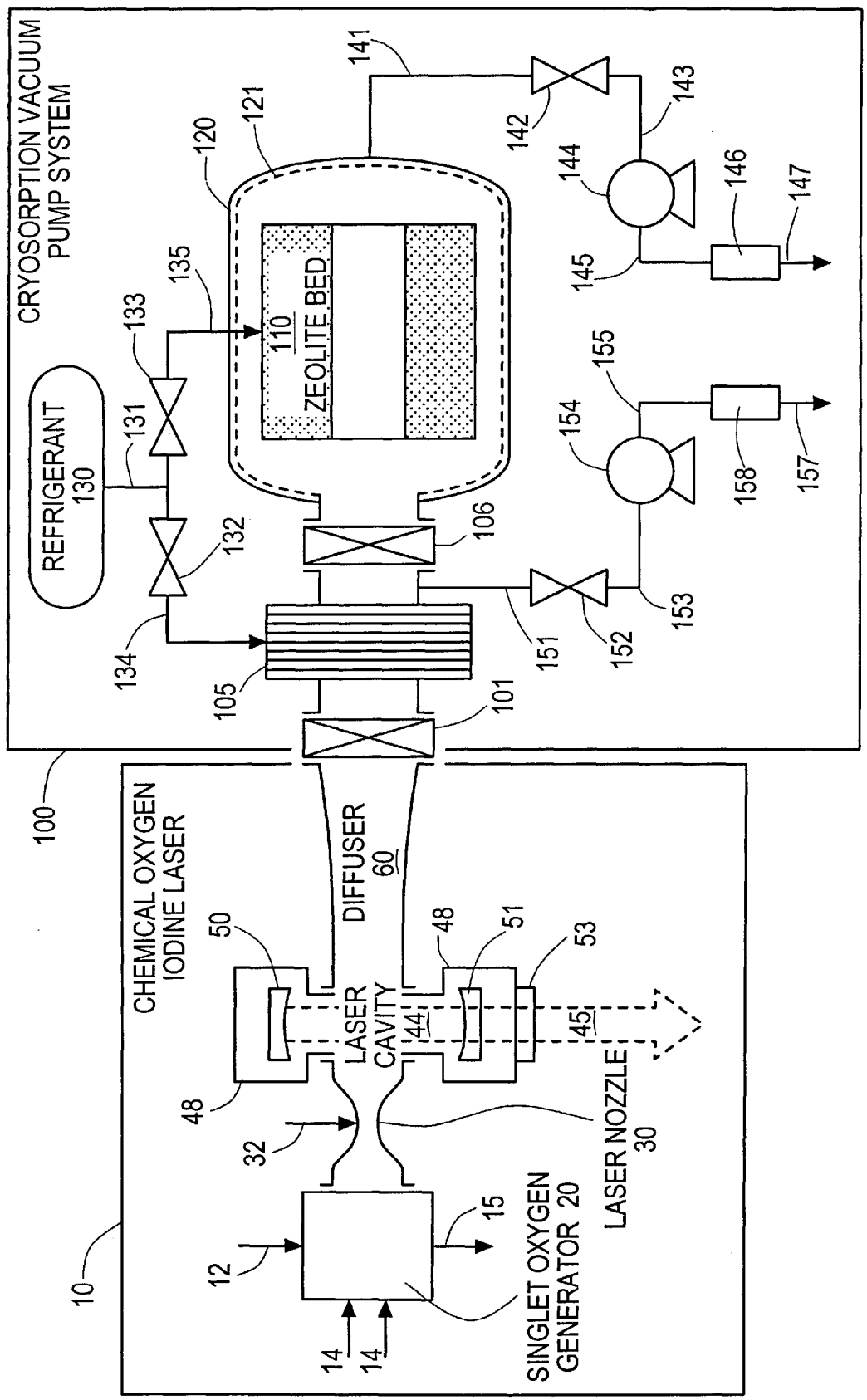
FIG. 1 is a schematic illustration of a cryosorption vacuum pump system with an associated COIL system in a conventional SECOIL system.
Figure 2:
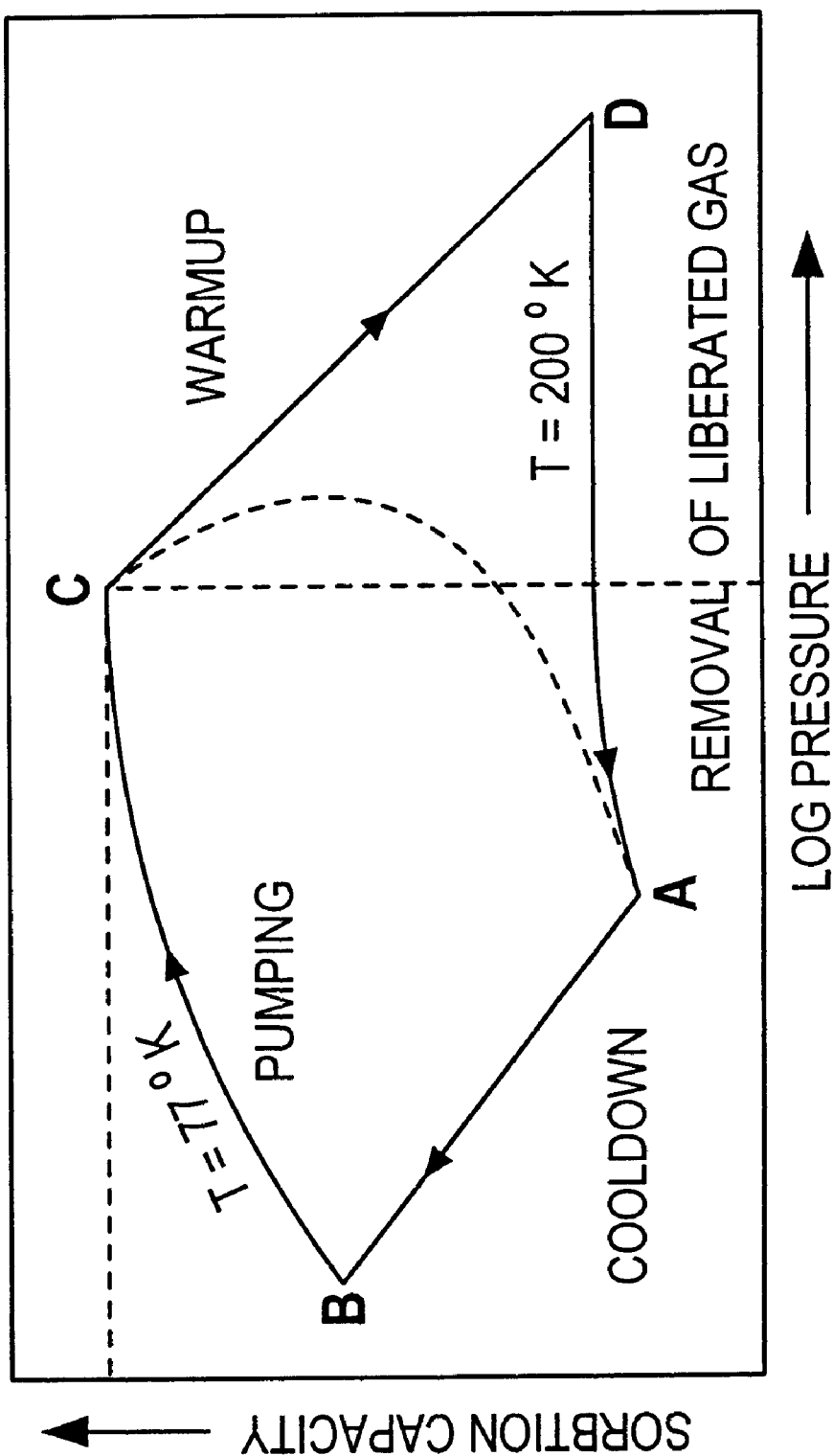
FIG. 2 is a plot of sorption capacity versus log pressure to illustrate the working function of the zeolite used in conjunction with the COIL system/cryosorption vacuum pump system.
Figure 4:
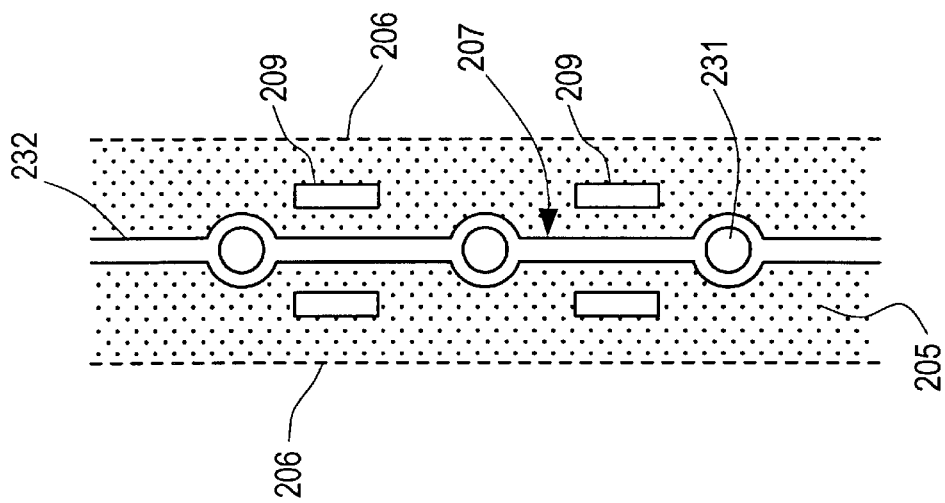
FIG. 4 is an enlarged cross-sectional view of a section of a zeolite container.
Figure 3:
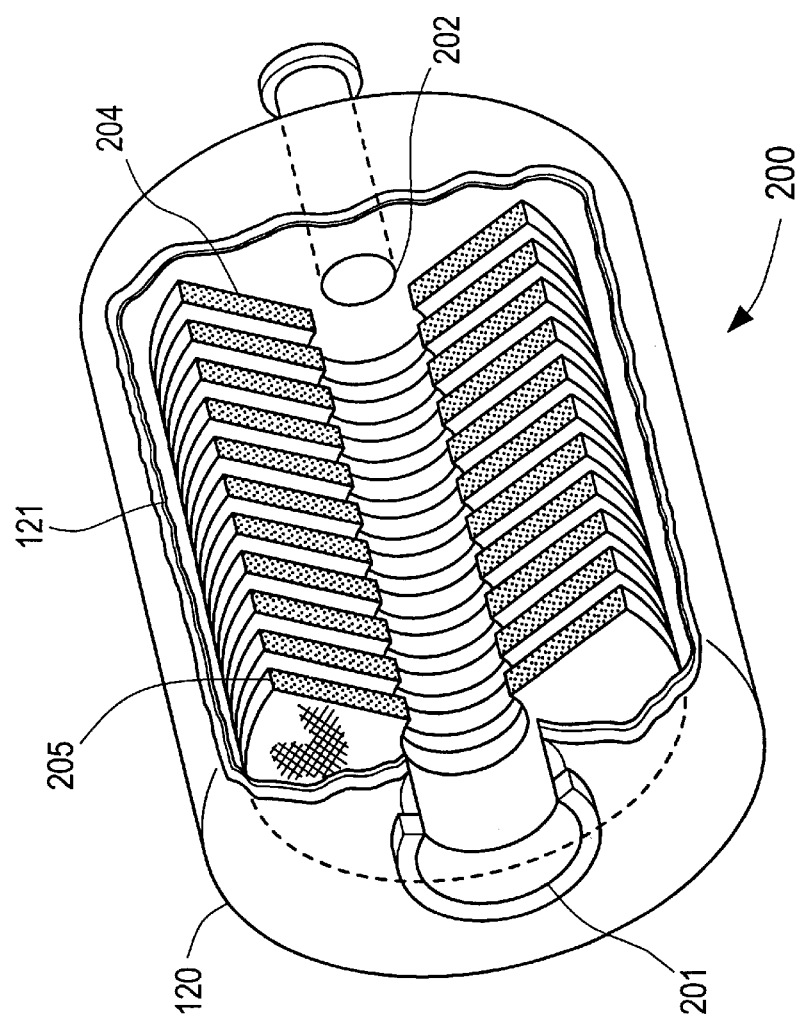
FIG. 3 is a perspective view, partially cutaway, of a vacuum vessel containing zeolite.
Figure 5:
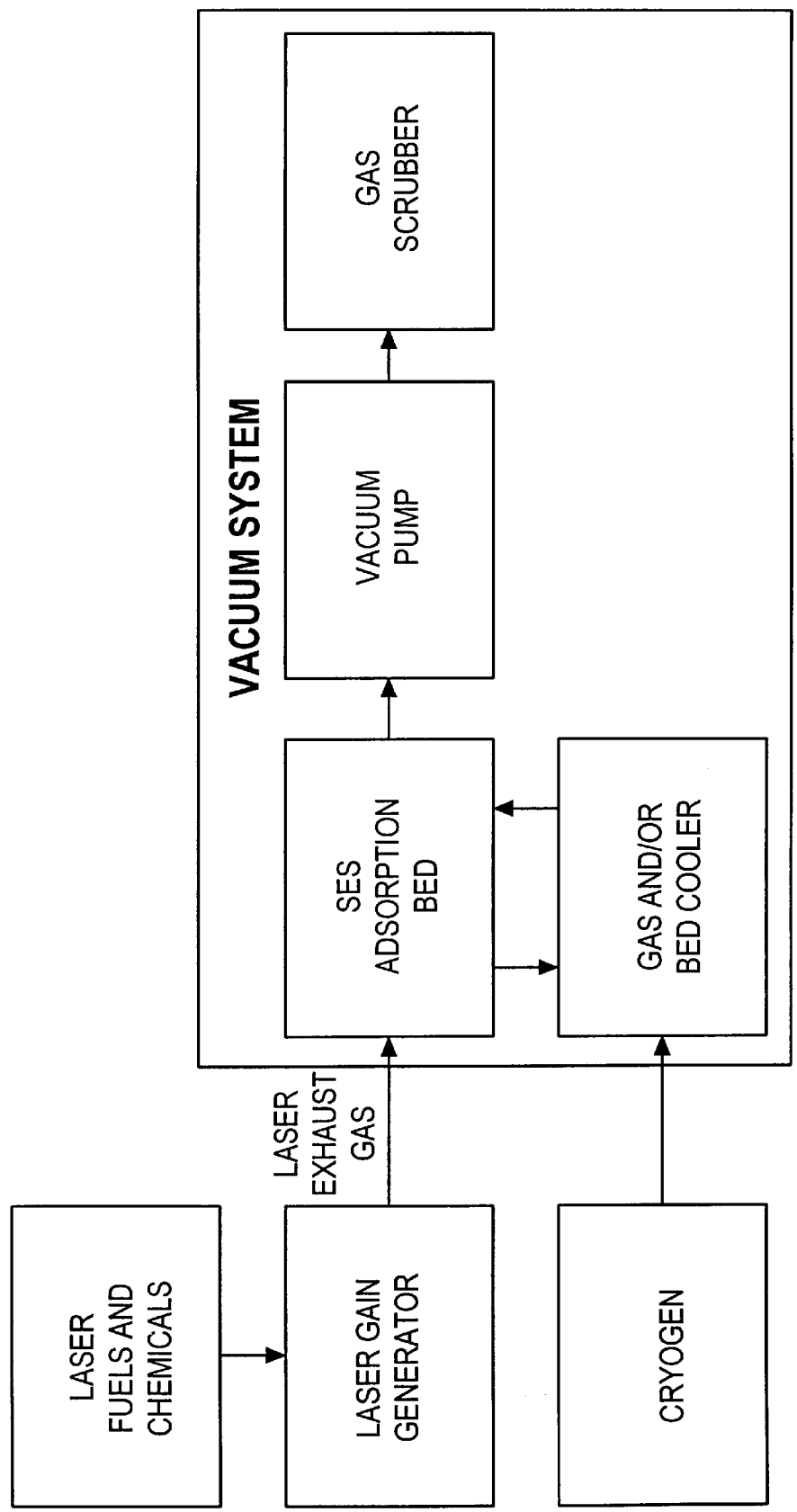
FIG. 5 is a block diagram of the reprocessing system for a vacuum system of an SES system used in conjunction with a COIL system, in accordance with one embodiment of the present invention.

Referring to FIG. 5, the SECOIL system block diagram is shown. The laser exhaust gas exits the laser gain generator and is sent to the vacuum exhaust system, specifically the SES adsorbent bed. The SES adsorbent bed is continuously being evacuated at low capacity compared to the full flow rate from the laser, and is being cooled continuously either by gas recirculation and cooling or by flow of cryogen through the structure of the SES adsorbent bed. The vacuum pump typically will provide only 1 to 10% of the volumetric flow capacity required for direct pumping of the full laser exhaust flow. The vacuum pump, in removing gas by desorption from the SES adsorbent bed, also removes the isothermal heat of adsorption of that gas. The sensible heat contained by the laser exhaust gas above the SES adsorbent bed temperature is removed by the gas and/or bed cooler. This cooler is sized also to remove any other thermal loads on the SES adsorbent bed, such as heating from the exterior. When the gas evacuation and gas/bed cooling processes are correctly balanced, it is possible to restore the initial state of the adsorbent bed (prior to gas adsorption) and continue operation of the adsorbent bed indefinitely.

Figure 6B:
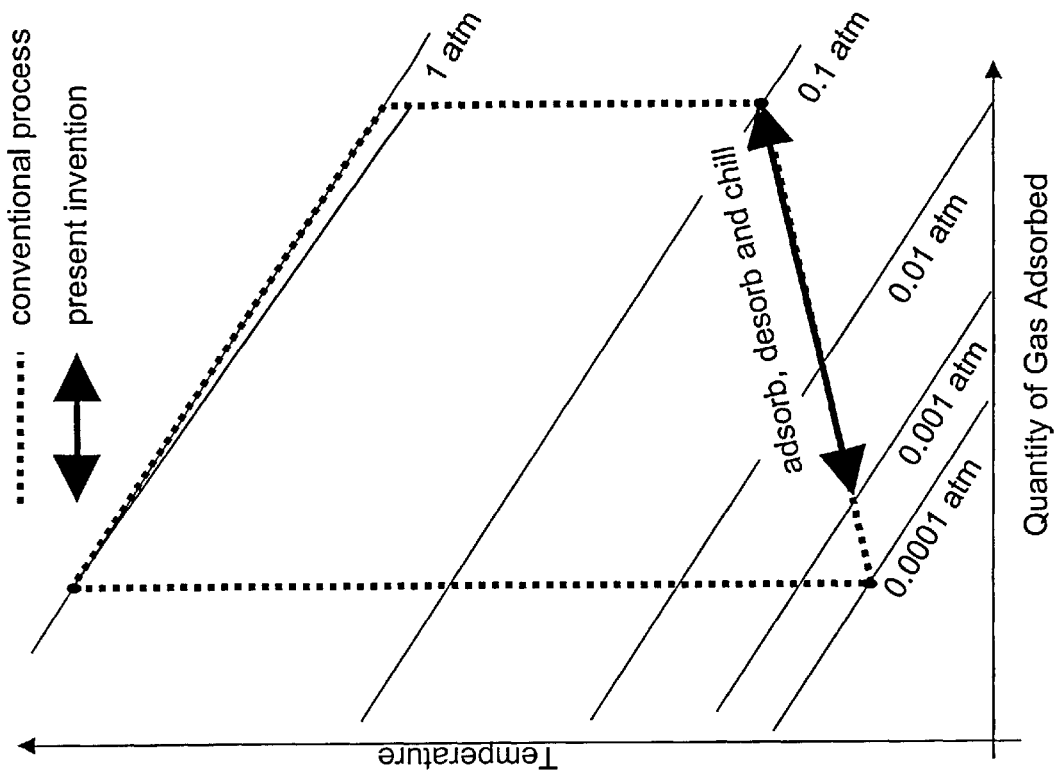
FIG. 6B is a graphical illustration of the pressure-temperature cycle of the reprocessing system of the present invention, in accordance with one embodiment of the present invention.
Figure 6A:
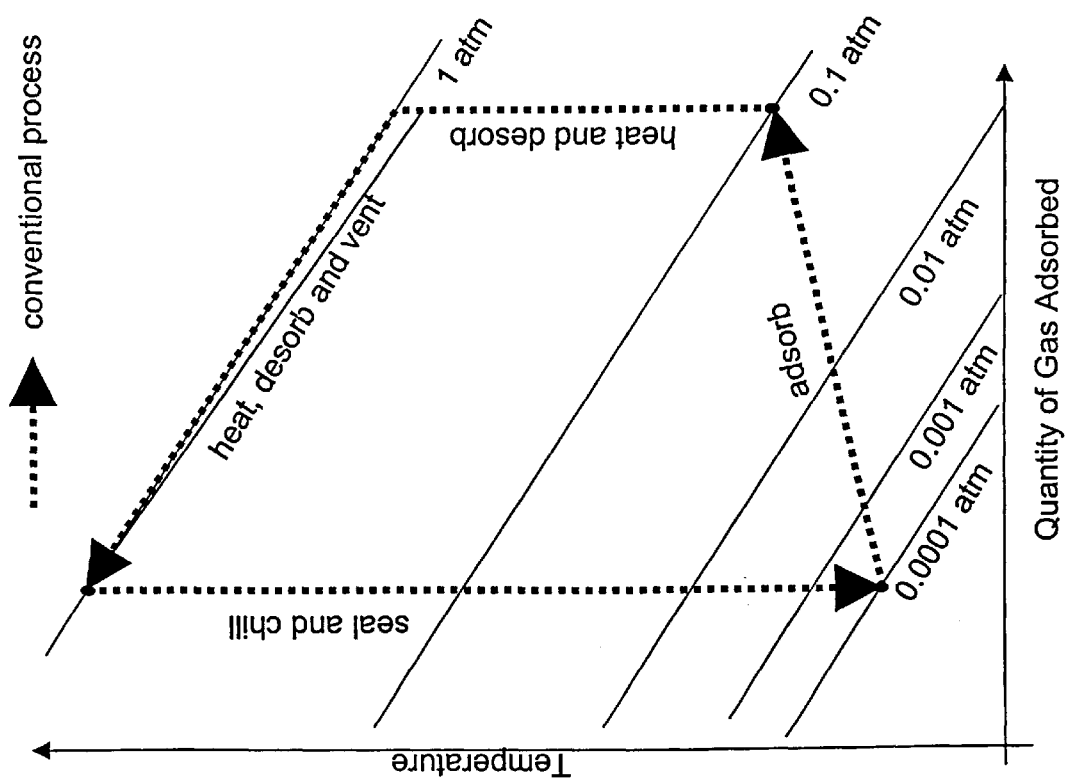
FIG. 6A is a graphical illustration of the pressure-temperature cycle of a conventional adsorption bed.

The distinctions between a conventional method of reprocessing adsorbent beds and the system of the present invention are shown in FIG. 6. The pressure-temperature cycle for the conventional adsorption and reprocessing method shows that the zeolite adsorption bed starts at a low temperature and pressure (typically 77° K and <1 Torr). The corresponding gas loading, $\theta$, is approximately 1% of full loading. The adsorption process increases the gas loading, temperature, and pressure until the maximum allowable pressure for sustained laser operation is reached. Heating to a high temperature reprocesses the bed while gas is evolved and drawn off. The final condition is a temperature of 400° K, a pressure of 1 atm., and a gas loading again of approximately 1% of full loading. Sealing the bed and rechilling the bed to 77° K restores the initial conditions. In the case depicted, the bed adsorbs and desorbs about 30% of theoretical loading. This series of steps requires large amounts of energy for heating and cryogen for cooling over the large (approximately 300° K, approximately 600° F.) temperature range. For example, a typical system will consume more than 30 pounds of cryogen in the cooling process per pound of gas pumped (adsorbed) by the bed.

By contrast, the improved system of the present invention begins with the adsorption bed at a higher temperature and pressure, and utilizes only 10–25% of the full loading capacity of the zeolite adsorbent. The adsorption and reprocessing have essentially the same path (see FIGS. 6A and 6B). In spite of the lower utilization of the zeolite, the cryogen consumption is reduced by approximately 80% to only 5 pounds per pound of gas pumped (adsorbed). The reduction in energy for heating the bed is in approximately the same relationship, although, in general, it is the cost of the cryogen which dominates the operating cost of the system.

Figure 7:
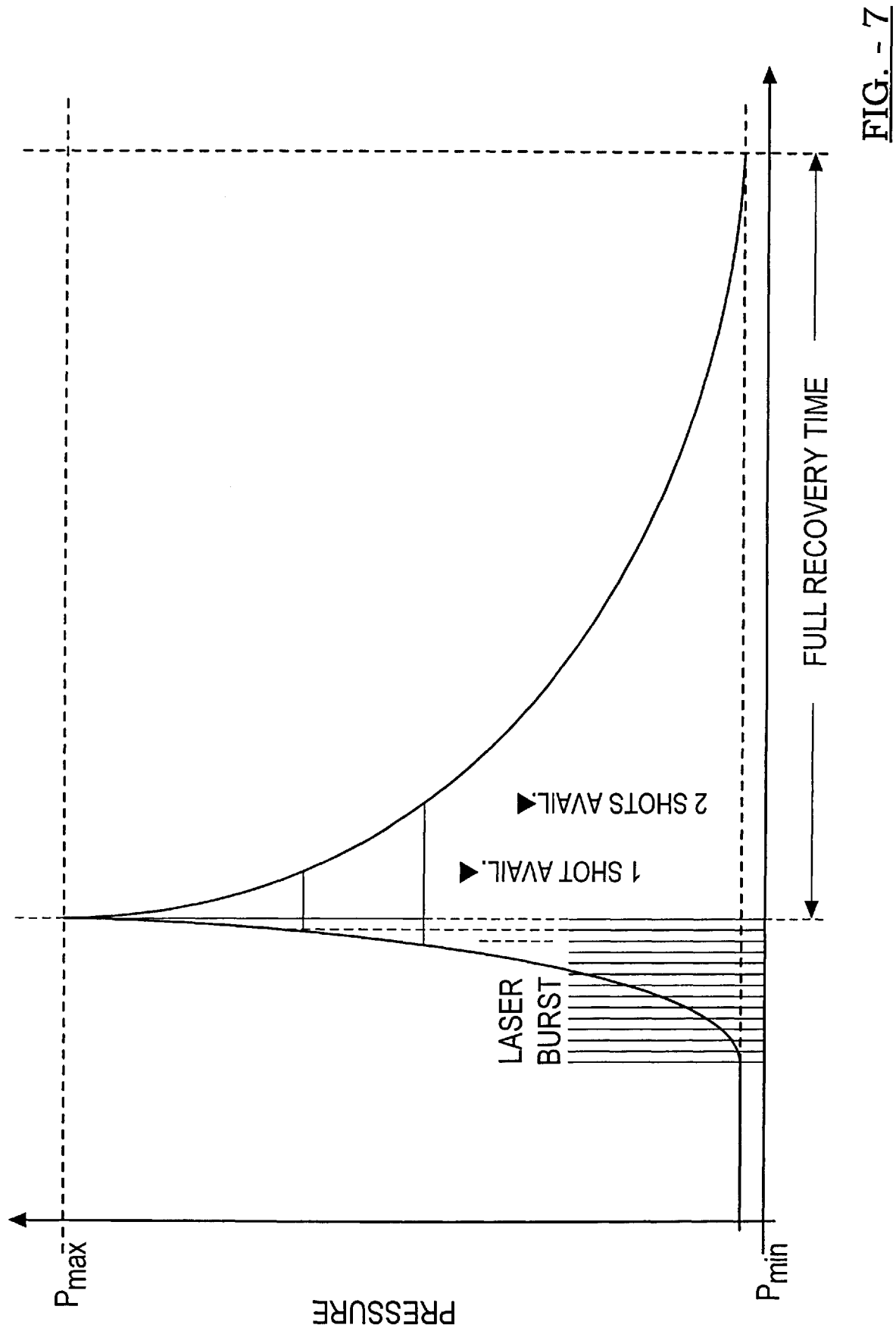
FIG. 7 is a time history of the operation of the zeolite adsorbent bed.

Referring to FIG. 7, the time history of operation of the zeolite bed is shown. Here, it is assumed that the laser is operated in a "burst" mode, in which a large amount of lasing is accomplished in a brief time period. The laser is then assumed to be off-line for some period of time following this burst. This is characteristic of high-power laser applications such as laser weapons and laser welding, where there is some "waiting" period while either the next weapon targets or next welder work piece is to be addressed. The reprocessing is occurring continuously, but is very much overwhelmed during the active operating (lasing) period. At the conclusion of the lasing burst, the reprocessing can be seen to return the system to its initial state over a long time compared to the burst duration. However, as is also seen, a single laser "shot" can be taken after only a brief recovery period, and additional shots after somewhat more extended periods.

The present invention thus reduces the cost, weight, and volume of materials required for reprocessing of SES adsorbent beds; eliminates the long time periods over which the SES adsorbent bed is unavailable due to the reprocessing thermal cycle; and simplifies the laser system, including the elimination of several operating modes of the laser system.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A sealed exhaust system for use in conjunction with a chemical oxygen-iodine laser system, wherein the chemical oxygen-iodine laser system includes a laser cavity, comprising:
   a sealed exhaust system for removing exhaust gas from the laser cavity, the sealed exhaust system comprising:
      a sorption assembly for sorbing a sorbable material contained in the exhaust gas; and
      a temperature control assembly for controlling the temperature of the exhaust gas and the sorption assembly;
   a vacuum pump assembly in communication with the sorption assembly, wherein the vacuum pump assembly pumps exhaust gases desorbed from the sorption assembly.

2. The invention according to claim 1, further comprising a source of cryogenic fluid in communication with the temperature control assembly.

3. The invention according to claim 1, further comprising a scrubber assembly in communication with the vacuum pump assembly, wherein the scrubber assembly receives exhaust gas pumped by the vacuum pump assembly.

4. The invention according to claim 1, wherein the sorption assembly comprises a bed of adsorbent media.

5. The invention according to claim 4, wherein the adsorbent media is zeolite.

6. A sealed exhaust chemical oxygen-iodine laser system, comprising:
   (a) a chemical oxygen-iodine laser system including a laser cavity; and
   (b) a sealed exhaust system for removing exhaust gas from the laser cavity, the sealed exhaust system comprising:
      (i) a sorption assembly for sorbing a sorbable material contained in the exhaust gas; and
      (ii) a temperature control assembly for controlling the temperature of the exhaust gas and the sorption assembly; and
   (c) a vacuum pump assembly in communication with the sorption assembly, wherein the vacuum pump assembly pumps exhaust gases desorbed from the sorption assembly.

7. The invention according to claim 6, further comprising a source of cryogenic fluid in communication with the temperature control assembly.

8. The invention according to claim 6, further comprising a scrubber assembly in communication with the vacuum pump assembly, wherein the scrubber assembly receives exhaust gas pumped by the vacuum pump assembly.

9. The invention according to claim 6, wherein the sorption assembly comprises a bed of adsorbent media.

10. The invention according to claim 9, wherein the adsorbent media is zeolite.

11. A method of operating a sealed exhaust chemical oxygen-iodine laser system, comprising:
(a) providing a chemical oxygen-iodine laser system including a laser cavity; and
(b) providing a sealed exhaust system for removing exhaust gas from the laser cavity, the sealed exhaust system being in communication with the laser cavity, the sealed exhaust system comprising:
  (i) a sorption assembly for sorbing a sorbable material contained in the exhaust gas; and
  (ii) a temperature control assembly for controlling the temperature of the exhaust gas and the sorption assembly; and
(c) a vacuum pump assembly in communication with the sorption assembly, wherein the vacuum pump assembly pumps exhaust gases desorbed from the sorption assembly.

12. The invention according to claim 11, further comprising providing a source of cryogenic fluid in communication with the temperature control assembly.

13. The invention according to claim 11, further comprising providing a scrubber assembly in communication with the vacuum pump assembly, wherein the scrubber assembly receives exhaust gas pumped by the vacuum pump assembly.

14. The invention according to claim 11, wherein the sorption assembly comprises a bed of adsorbent media.

15. The invention according to claim 14, wherein the adsorbent media is zeolite.

16. A system for allowing substantially efficient operation of a chemical laser, the system comprising:
a supply of at least a first chemical species;
a laser cavity operably connected to receive said first chemical species to form a laser;
a sealed pump operably connected to said laser cavity to remove an exhaust from said laser cavity;
a sorption material disposed in said sealed pump to adsorb at least a portion of said exhaust; and
a temperature control system to control a temperature of said sealed pump to efficiently remove said exhaust from said sorption material.

17. The system of claim 16, further comprising:
a second chemical species supply, wherein said first chemical species and said second chemical species are introduced into said laser cavity and react to form said laser; and
a cryogen supply to supply a volume of a cryogen material via said temperature control system to said sealed pump;
wherein a selected volume of said exhaust is sorbed onto said sorption material by selecting a temperature view said temperature control system.

18. The system of claim 16, wherein said temperature control system is able to regenerate said sorption material by warming said sorption material to a selected temperature to desorb said exhaust.

19. The system of claim 16, wherein said sorption material sorbs no more than about 50% of said sorption material sorbing capacity of said exhaust.

* * * * *

UNITED STATES PATENT AND TRADEMARK OFFICE
CERTIFICATE OF CORRECTION

PATENT NO. : 6,621,848 B1
DATED : September 16, 2003
INVENTOR(S) : Alan Zachary Ullman et al.

It is certified that error appears in the above-identified patent and that said Letters Patent is hereby corrected as shown below:

Column 2,
Line 53, remove "*" after "21"

Column 12,
Line 14, "singe" should be -- since --

Column 13,
Line 7, add: -- U.S. Patent No. 5,889,807 issued to Cunningham et al. discloses a continuous wave photolytic iodine laser that has a gain cell for receiving a continuous supply of gaseous fuel. The gain cell is connected to laser beam transfer optics, a laser resonator for shaping a laser beam, and a lamp. The lamp is driven by a microwave subsystem such that a laser gain medium is pumped through the gain cell. The continuous wave photolytic iodine laser of the present invention incorporates a closed loop fuel system for presenting gaseous fuel to the gain cell at a rate sufficient to sweep any lasing by-products out of the gain cell, thereby preventing quenching of the lasing process. The fuel system also includes a condenser for converting the gaseous fuel to a liquid after it has passed through the gain cell, a scrubber for removing the by-products of the lasing process from the fuel, and an evaporator for converting the recycled liquefied fuel back to a gas. The closed loop fuel system also includes a pump for pressurizing and transporting the liquefied fuel. --

Column 17,
Line 26, add: -- providing -- after "(c)"

UNITED STATES PATENT AND TRADEMARK OFFICE
CERTIFICATE OF CORRECTION

PATENT NO. : 6,621,848 B1
DATED : September 16, 2003
INVENTOR(S) : Alan Zachary Ullman et al.

It is certified that error appears in the above-identified patent and that said Letters Patent is hereby corrected as shown below:

<u>Column 18,</u>
Line 17, add: -- ; and --
Line 17, after "material" add: -- a vacuum pump assembly in communication with the sealed pump, wherein the vacuum pump assembly pumps exhaust gases desorbed from the sorption material. --

Signed and Sealed this

Twentieth Day of January, 2004

JON W. DUDAS
*Acting Director of the United States Patent and Trademark Office*